Figure 1:
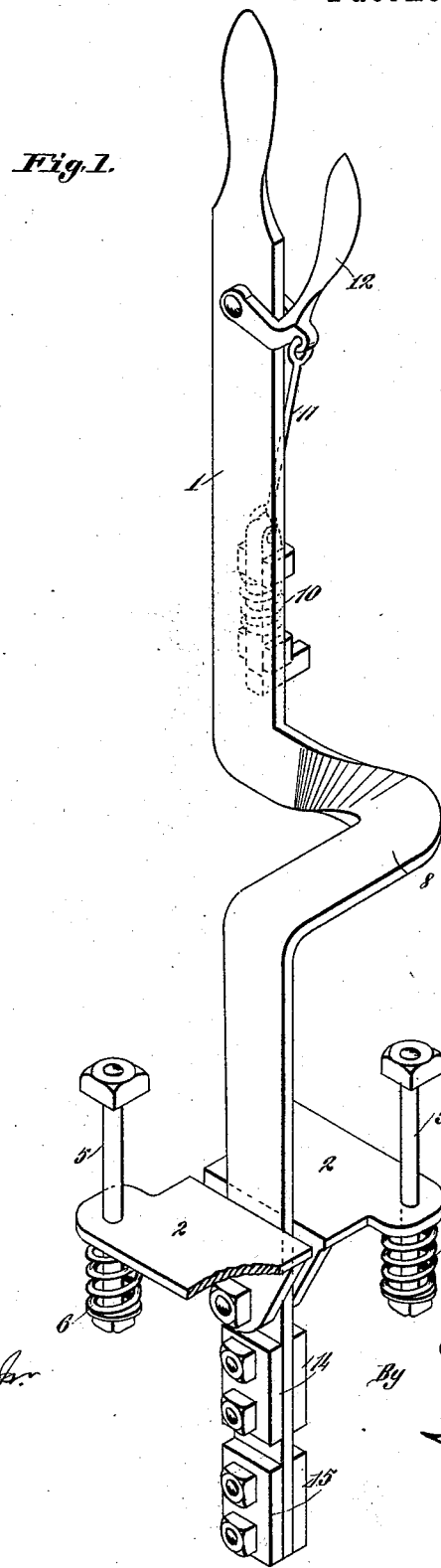

(No Model.)   2 Sheets—Sheet 1.

E. ALLEN.
BRAKE FOR CABLE RAILWAYS.

No. 393,601.   Patented Nov. 27, 1888.

Witnesses:
Charles Pickles
N. W. Perkins Jr.

Inventor:
Ethan Allen
By
Fowler & Fowler
Attorneys.

(No Model.) 2 Sheets—Sheet 2.
E. ALLEN.
BRAKE FOR CABLE RAILWAYS.
No. 393,601. Patented Nov. 27, 1888.
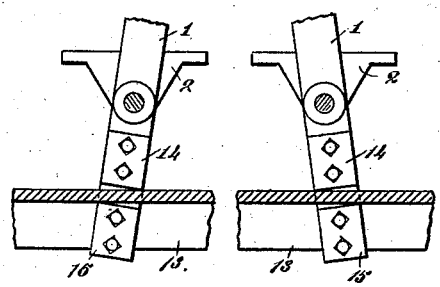
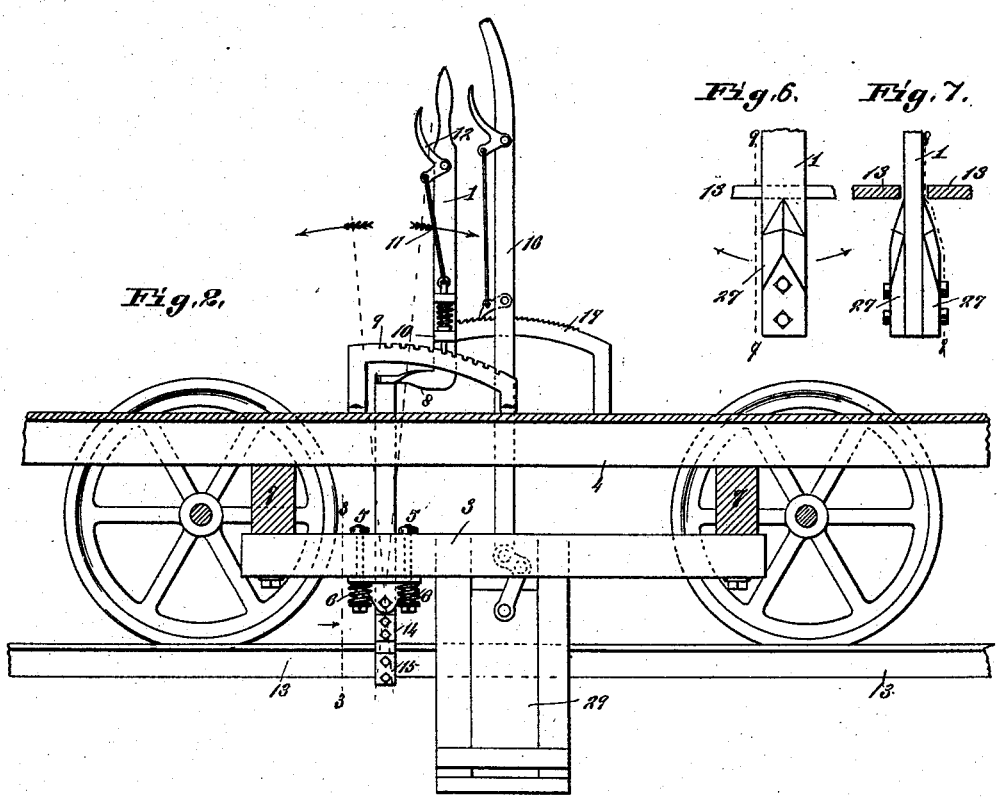
Witnesses:
Charles Pickles,
N. W. Perkins Jr.
Inventor:
Ethan Allen
By
Fowler & Fowler
Attorneys

UNITED STATES PATENT OFFICE.

ETHAN ALLEN, OF ST. LOUIS, MISSOURI.

BRAKE FOR CABLE RAILWAYS.

SPECIFICATION forming part of Letters Patent No. 393,601, dated November 27, 1888.

Application filed February 20, 1888. Serial No. 264,555. (No model.)

*To all whom it may concern:*

Be it known that I, ETHAN ALLEN, a citizen of the United States, residing at St. Louis, in the State of Missouri, have invented certain new and useful Improvements in Brakes for Cable Railways, of which the following is such a full, clear, and exact description as will enable any one skilled in the art to which it appertains to make and use the same, reference being had to the accompanying drawings, forming part of this specification.

My improvements relate more especially to cable railways when the same are used where the gradients are heavy. When brakes are used on heavy grades to prevent the wheels from rotating, the car will sometimes slide downhill, notwithstanding the wheels are held from rotation. It not unfrequently happens that great danger to life is thus caused by the rapid descent of the car. Should it be put on when the car has attained much retrograde momentum, the grip will be broken, and thus all means of checking the descent of the car is removed.

My invention relates to means and mechanism for overcoming this difficulty; and it consists, briefly, in providing the cars with a positive brake of substantially the construction set forth that grasps some fixed object along the way, preferably the conduit. The brake-lever may be arranged anywhere on the car, but preferably works alongside of the grip-lever, so as to be within the grasp of the operator, so that a positive stop is provided for the car in case the brakes applied to the wheels fail to act, or in the event of the car sliding downhill when the wheels are held from rotation by the brakes.

I will now proceed to describe my invention in detail, and will refer to the accompanying drawings, in which—

Figure 1 is an isometric projection of my brake detached from the car. Fig. 2 is a side elevation, partly sectioned, of my brake applied to a car, showing also the grip and conduit-rail. Fig. 3 is an end view of the brake-lever taken on the line 3 3 of Fig. 2. Figs. 4 and 5 are side elevations of the same on the line 4 5 of Fig. 3, showing two positions, respectively, of the brake-lever. Figs. 6 and 7 are views of a modification on lines 6 6 and 7 7 of Figs. 7 and 6, respectively.

The same figures of reference indicate the same or corresponding parts throughout the various views.

1 is a brake-lever pivoted between two angle-plates, 2 2, which are supported by beams 3 3, carried by the truck or frame 4 of the car and supported from said beams by bolts 5 5, provided at their lower ends with spiral springs 6 6, so that the brake lever may have a certain amount of play. The beams 3 3 are suspended by cross-pieces 7, bolted to the frame 4 of the car, as clearly shown in Fig. 2.

In order to place the brake-lever adjacent to the grip lever and have the two within easy reach of the operator, I provide the brake-lever with a double right-angle curve, 8. Upon the frame or floor of the car I provide a rack, 9, which is engaged by, preferably, a spring-actuated tooth, 10, mounted upon the brake-lever 1. The spring actuated tooth is connected by a link, 11, to a bell-crank lever, 12, pivoted near the handle of said lever, so that the operator can disengage the tooth from the rack and move the brake in any direction with one hand.

13 13 represent the facings of the conduit-slot, which are preferably engaged by the brake. To the lower end of the brake-lever 1, I bolt plates 14 15 with a slight space between them for the facing of the conduit-slot to work in. It will be observed that when the brake-lever is inclined in one or the other direction that it grasps the facings 13 13, (see Figs. 4 and 5,) and forms a positive stop for the car, the direction of travel determining which way the brake-lever shall be inclined to stop the car. In Fig. 2 is also shown the grip-lever 16, having a ratchet, 17, mounted on the car, the grip 29 being carried by the cross-bars 3 3. This feature makes no part of my invention. The rack 9 and the ratchet 17 are arranged upon opposite sides of the slot in the bottom of the car, so that the grip and brake levers are entirely independent of each other in their operations.

In Figs. 6 and 7 I have shown a modification of the brake. This modification also I do not claim to be broadly new. In the last instance I remove the plates 14 and 15 from the brake-lever 1, first described, and provide the same with one set of plates, 27, which are normally arranged below the slot only, as shown in Figs. 8 and 9. When the brake-lever is inclined in one or the other direction, the wedge-shaped plates 27, carried by the same, will be raised by the rotation in contact with the vertical sides of the slot-facings 13 13, and will thus produce any required amount of friction between said facing and stop the car.

It will be noted that my brake is suspended from the frame of the car, and thus makes a strong and compact construction, not liable to be broken or deranged in any way. The arrangement is simple, and the construction one that will be durable and effective in preventing all accidents.

Having now fully set forth my invention and described its construction, operation, and advantages, what I desire to claim and secure by Letters Patent of the United States as my invention is—

1. A brake for cable railways, consisting of a brake-lever pivoted to the frame of a car, a conduit, a slot in said conduit, into which conduit the brake-lever normally projects, and brake-plates for said brake, adapted to grasp the slot-rail when the brake lever is operated in one or the other direction.

2. The combination, as hereinbefore set forth, to form a positive brake for a cable railway, of the brake-lever 1, pivoted to the body of the car, the rack 9, carried by said car, a tooth engaging said rack, mounted upon said brake-lever 1, a conduit having a slot therein, into which said brake-lever projects, and plates 14 and 15, located upon each side of the slot-rail and arranged below the pivot of said brake-lever, and operated by said brake-lever to grasp said conduit when said brake-lever is actuated in one or the other direction.

3. The combination of the angular brake-lever 1, pivoted to spring-mounted angle-plates supported by the frame-work of the car, a lock for said brake lever to hold it in any desired position, a conduit having a slot throughout the length thereof, into which slot the brake normally projects, and clamping-plates 14 and 15, located upon each side of the slot-rail and arranged below the pivot of said brake-lever, adapted to engage said slot when the brake-lever is operated in one or the other direction.

In testimony whereof I have hereunto set my hand, this 16th day of February, 1888, in the presence of the two subscribing witnesses.

ETHAN ALLEN.

Witnesses:
A. C. FOWLER,
JAS. F. ANDERSON.